US008156832B2

(12) United States Patent
Niklewski

(10) Patent No.: US 8,156,832 B2
(45) Date of Patent: Apr. 17, 2012

(54) MECHANICAL VIBRATOR HAVING ECCENTRIC MASSES

(75) Inventor: Andrzej Niklewski, Sao Paulo (BR)

(73) Assignee: Metso Brasil Industria E Comercia Ltda, Sorocaba (BR)

( * ) Notice: Subject to any disclaimer, the term of this patent is extended or adjusted under 35 U.S.C. 154(b) by 673 days.

(21) Appl. No.: 12/303,992

(22) PCT Filed: Jul. 4, 2007

(86) PCT No.: PCT/BR2007/000176

§ 371 (c)(1),
(2), (4) Date: Dec. 22, 2008

(87) PCT Pub. No.: WO2008/003156

PCT Pub. Date: Jan. 10, 2008

(65) Prior Publication Data

US 2011/0209571 A1 Sep. 1, 2011

(30) Foreign Application Priority Data

Jul. 5, 2006 (BR) ..................................... 0602961

(51) Int. Cl.
*F16H 33/00* (2006.01)

(52) U.S. Cl. ........................................................ 74/87

(58) Field of Classification Search ................ 74/61, 86, 74/87

See application file for complete search history.

(56) References Cited

U.S. PATENT DOCUMENTS 3,670,631 A 6/1972 Gaylor
5,220,846 A 6/1993 Niklewski et al.
6,551,020 B2 * 4/2003 Swanson et al. ............. 404/117

FOREIGN PATENT DOCUMENTS

GB 437268 10/1935

* cited by examiner

*Primary Examiner* — Thomas R Hannon
*Assistant Examiner* — Phillip A Johnson
(74) *Attorney, Agent, or Firm* — Fish & Richardson P.C.

(57) ABSTRACT

The mechanical vibrator is applied to vibrating screens or other equipment and comprises a bearing housing (10) to be affixed to a side wall (2) of the equipment (1), to carry a pair of bearings (20) which support a shaft (30) having an inner end portion (31) and an outer end portion (32) which respectively affix a first and a second counterweight (70, 80). The first and the second counterweights (70, 80) have respective first and second eccentric masses (M1, M2) of different values and which are positioned and dimensioned so that the first and the second counterweight (70,80) generate equal loads on the bearings (20). The second counterweight (80) is constructed to selectively and removably attach a third counterweight (90) presenting a third eccentric mass (M3) maintained aligned with the center line (CL) of the bearing housing (10), to provide a variation of the total eccentric mass of the vibrator (V), without changing the balance of the load distribution on the bearings (20).

12 Claims, 5 Drawing Sheets

MECHANICAL VIBRATOR HAVING ECCENTRIC MASSES

CROSS-REFERENCE OF RELATED APPLICATIONS

This application is the US National Phase Application under 35 U.S.C. §371 of International Patent Application No. PCT/BR2007/000176 filed Jul. 4, 2007, which claims priority to and the benefit of Brazilian Patent Application No. PI0602961-2, filed Jul. 5, 2006, each of which are hereby incorporated by reference in their entireties. The International Application published as WO 2008/003156 Jan. 10, 2008.

FIELD OF THE INVENTION

The present invention refers, in a general way, to mechanical vibrators mounted inside closed or semi-closed casings, usually used in pairs and individually installed on the sides of vibrating equipment which utilizes linear, circular or elliptical motions, either for screening, classification, transportation, dosing, feeding or simply vibration.

In a more specific way, the invention refers to a vibrator of the type that includes a bearing housing provided with one or more end flanges for fixing the vibrator to the side of the equipment and supporting, through a pair of bearings, a determined portion of a shaft carrying eccentric counterweights and being connectable to a motor unit, directly or by means of other mechanical vibrator.

PRIOR ART

One of the known solutions to move the vibrating screens with circular motion includes the provision of a mechanical vibrator V basically comprising, as illustrated in FIG. 1, a rigid bearing housing 10 lodging a pair of roller bearings 20 and incorporating a median peripheral flange 11 for fixing to a respective side wall 2 of the equipment 1, each bearing housing 10 supporting a respective short shaft 30 with its opposite ends 31, 32 carrying respective assemblies, each formed by a first counterweight 40 and at least one adjusting counterweight 41, one of the assemblies being internally lodged in the respective side wall of the equipment. The external end 32 of the short shaft 30 is coupled, on one of the sides of the equipment, to a motor unit (not illustrated). Figure illustrates an exemplary assembling in which two connected compact vibrators V are provided.

The assembling illustrated in FIG. 1 concerns a vibrating screen, on whose opposite side walls 2 are bolted respective compact mechanical vibrators V, connected to each other by a connecting shaft 100. Considering that the mounting of the vibrators V is made between the classifying floors of the screen and that the classified material drops from the first floor to the second, it is necessary to surround the internal counterweights of each vibrator V with a protective casing 60, the same occurring with the connecting shaft 100, which is surrounded by a respective elongated protector 61, said parts requiring sealing means that are laborious to assemble and very vulnerable to failures. Thus, each of the two vibrators V is mounted in the respective side wall 2 of the vibrating screen (or similar equipment) and connected to the other vibrator V through a flexible connecting shaft 100, as illustrated.

In a compact vibrator of the type cited above, the load distribution on two roller bearings 20 instead of one, as it occurs with the known long shaft arrangements, permits to reduce the diameters of the roller bearings 20 and thereby to operate in higher rotation speeds.

However, despite presenting several advantages over the long shaft arrangements, the compact arrangement (with short shaft 30) cited above introduced some limitations that did not exist in the classic arrangement of long transversal shaft and which include:

1—The occupation of an undesirable internal space in the screen (or other equipment) resulting from great radii of eccentricity equally utilized for the eccentric counterweights internal and external to the side wall 2 of the equipment 1. This arrangement also conducts to an undesirable increase in the distance between the classifying floors of a screen.

2—The setting of the eccentric mass has to be effected also inside the equipment, since the eccentric counterweights 41 (of adjustment) are located on both sides of the respective side wall 2 of the equipment 1. The difficult access usually conducts to setting errors, unbalancing the loads on the bearings 20 of each bearing housing 10.

3—The setting of the internal eccentric counterweights requires the removal of the protective casing 60 which surrounds them in the interior of the equipment 1 and which is difficult to seal in the reassemblies, facilitating the penetration of dust in the inner ambient of the vibrator V and shortening the lifetime of the bearings 20.

The ideal would be to use prior art compact vibrators, as illustrated in FIG. 1, but with setting of eccentric masses only on the external side of the respective side wall 2 of the equipment 1. However, the mechanical viability of this arrangement is highly reduced.

It should be noticed that, on the balanced situation illustrated in FIG. 1, no bending moment Mo is applied on the side of the equipment, since:

$$P1 \times L1 = P2 \times L2$$

$$P1 = F2 = \frac{P1 + P2}{2}$$

$$Mo = 0$$

The removal of a second eccentric counterweight 41 (of adjustment) from one side only, that is, from the external side, creates an unbalanced situation, making a bending moment appear on the side wall 2 of the equipment 1, as well as reaction forces F1 and F2 on the bearings 20, which forces, instead of being equally distributed, as in the case of the compact vibrator V of FIG. 1, are different and amplified.

A bending moment Mo different from "zero" is created in relation to the side wall 2 of the equipment 1, once the equilibrium of bending moments in relation to the center point of the mechanism was destroyed.

Such bending moment is unacceptable to the side wall 2 of any vibrating screen or similar equipment 1 and also to the bearing housings 10.

Patent BR PI 9005855 (U.S. Pat. No. 5,220,846) proposes a constructive solution, according to which each vibrator has a short shaft mounted in a pair of roller bearings contained in a bearing housing affixed to a respective side wall of the equipment, said short shaft carrying an assembly defined by a first counterweight (main) and an adjusting counterweight on its end external to the equipment and only one first counterweight (fixed) on the end of the short shaft internal to the equipment.

According to this prior proposal, the first counterweight (fixed), internal to the equipment, presents reduced mass and radial dimension and a relatively large axial distance from the center of the bearing housing. On the other hand, the first counterweight (main), external to the equipment, presents larger eccentric mass and radial dimensioning, but a smaller axial distance from the center of the bearing housing.

The eccentric mass, the axial distance from the center of the bearing housing and also the radial dimensioning of the first external counterweight are variable, to guarantee the production of the eccentric force required by the equipment, maintaining the bending moment on the bearing housing equal to that produced by the rotation of the first internal counterweight (fixed). Such variation of the characteristics of the first counterweight is obtained by affixing it in two possible axial distances in relation to the center of the bearing housing and determining different predetermined mounting positions of the adjusting counterweight in the first counterweight. The mass of the adjusting counterweight can also vary in predetermined values.

Despite actually transferring, to the exterior of the equipment, the settings of the eccentric force to be produced by the vibrator, this prior art solution still presents limitations regarding the variation of the axial distance of the eccentric mass of the main counterweight in relation to the center of the bearing housing, allowing only two basic positions for mounting the adjusting counterweight to the first counterweight. Besides, the radial dimensioning variations are also limited as a function of the possible variations in mounting the adjusting counterweight to the first external counterweight.

SUMMARY OF THE INVENTION

The present invention has as object to provide a mechanical vibrator for vibrating screens and other equipment, which presents a short and low weight shaft, requiring a pair of bearings of reduced dimensions, to be operated in high rotation speed; which can be mounted on a side wall of the equipment, in a way to present counterweight adjustment only externally to this side wall; and which allows obtaining a balanced distribution of forces on the bearings and absence of bending moment on the side walls of the equipment.

As mentioned before, the invention applies for a mechanical vibrator of the type which comprises: a bearing housing to be affixed to a side wall of the equipment and internally carrying, symmetrically to a center line, a pair of bearings; a shaft supported by the pair of bearings and having an inner end portion and an outer end portion, projecting outwardly from the bearing housing.

According to the present invention, the inner end portion and the outer end portion of the shaft respectively affix a first and a second counterweight having respective first and second eccentric masses of different values and presenting respective first and second radial extensions and first and second distances to the center line of the bearing housing which are dimensioned so that said first and second counterweights generate equal loads on the bearings and equilibrium of moments on the side wall of the equipment, said second counterweight selectively and removably affixing a third counterweight presenting a third eccentric mass, which is maintained aligned with the center line of the bearing housing, so as to provide a respective variation of the total eccentric mass of the vibrator, without changing the balance of the distribution of loads on the bearings.

The new constructive arrangement cited above allows obtaining a compact vibrator, provided with shaft and inner counterweight of reduced dimensions, and which permits the setting of the eccentric mass, from a basic project value, only on the outside of the equipment, maintaining, however, the equalization of the loads on the bearings of the bearing housing and the desirable null or reduced bending moments on the side walls of the equipment.

The fact that the first radial extension of the first counterweight internal to the equipment is reduced allows constructing a protecting casing and an elongated protection (if the connecting shaft exists) of reduced dimensions, and which conducts to a smaller vertical distance between the classifying floors in an equipment in the form of a screen.

BRIEF DESCRIPTION OF THE DRAWINGS

The invention will be described below, with reference to the enclosed drawings, given by way of example of a possible embodiment of the invention and in which.

DETAILED DESCRIPTION OF THE INVENTION

Figure 1:
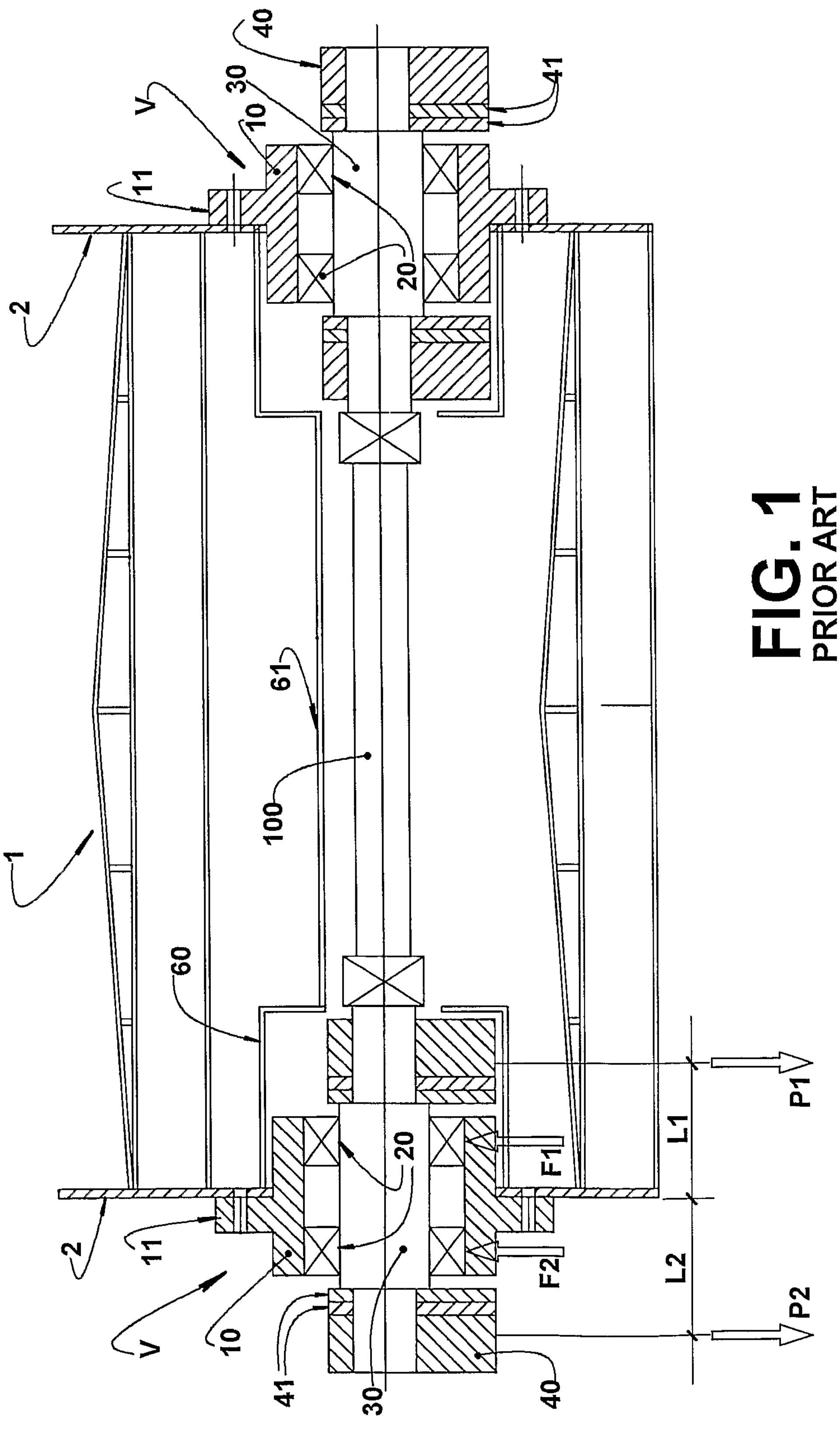
FIG. 1 PRIOR ART
FIG. 1 represents a diametral longitudinal sectional view of a pair of vibrators of the type considered herein and known in the prior art, applied to a vibrating screen.

As described above and illustrated in FIG. 1, the present vibrator V is of the type which comprises a bearing housing 10 made of steel or another adequate material, incorporating an outer flange 11 and provided with an inner radial recess 12 opened to a passage 13 to be connected to a connector (not illustrated), to allow the supply of oil or grease to the interior of the bearing housing 10.

Figure 4:
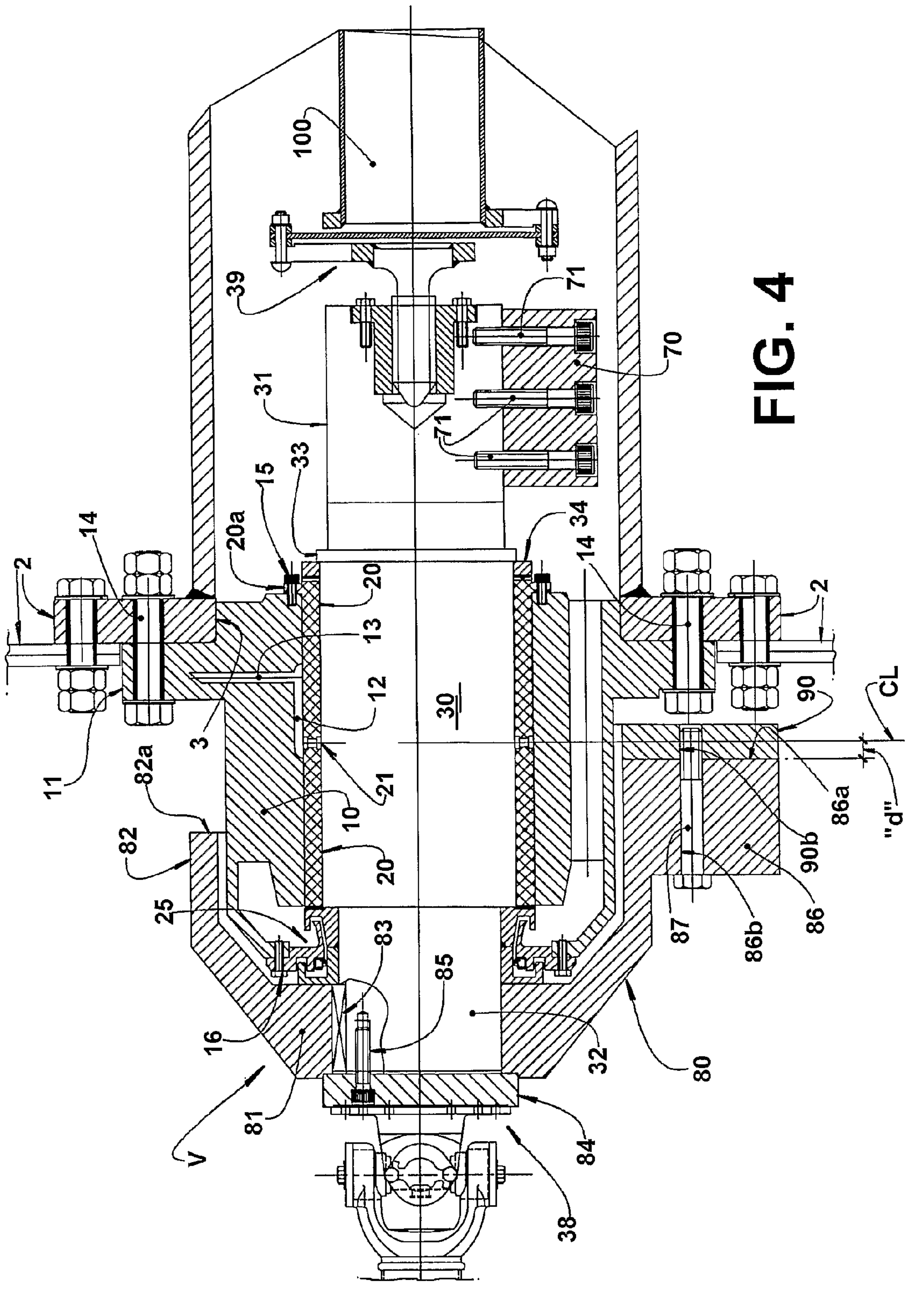
FIG. 4 represents an enlarged diametral longitudinal sectional view of one of the vibrators illustrated in FIG. 3, to be coupled to a motor unit.

As best illustrated in FIG. 4, the outer flange 11 of the bearing housing 10 is seated against a side wall 2 of the equipment 1 (in the illustrated example being defined by a vibrating screen), to be there affixed by bolts 14. Considering that the outer flange 11 is positioned in a median eccentric region of the bearing housing 10, the latter has a portion of its axial extension projecting inwardly of the equipment 1, through a respective opening 3 provided on the side wall 2, and another portion of its axial extension positioned outside the equipment 1.

The bearing housing 10 internally carries two bearings 20 which, in the illustrated construction, take the form of sliding bearings defined by bushings adequately retained in the interior of the bearing housing 10 and having their mutually adjacent edges disposed in the region of the bearing housing 10 in which is provided the inner radial recess 12. The two bearings 20 are axially spaced from each other by a spacing ring 21 and dimensioned to support the median region of a short shaft 30, having an inner end portion 31 and outer end portion 32 projecting respectively inwardly of and outwardly from the bearing housing 10.

In its end internal to the side wall 2, the bearing housing 10 secures, by means of axial eccentric bolts 15, a small peripheral end flange 20*a* of the adjacent bearing 20, the corresponding inner end portion 31 of the shaft 30 being provided with a circumferential rib 33 to be axially seated against a thrust ring 34 which, on its turn, is axially seated against the external end of the adjacent bearing 20. On its other end, external to the side wall 2 of the equipment 1, the bearing housing 10 is configured to carry, by means of bolts 16 or another adequate fastening means, a retaining means 25 which actuates on the adjacent cylindrical surface of the shaft 30 and also on the external end of the adjacent bearing 20.

As seen in the figures of the drawings, the two bearings 20 of each vibrator V are symmetrically positioned in relation to a center line CL of the bearing housing 10, disposed in a plane transversal to the latter.

Figure 2B:
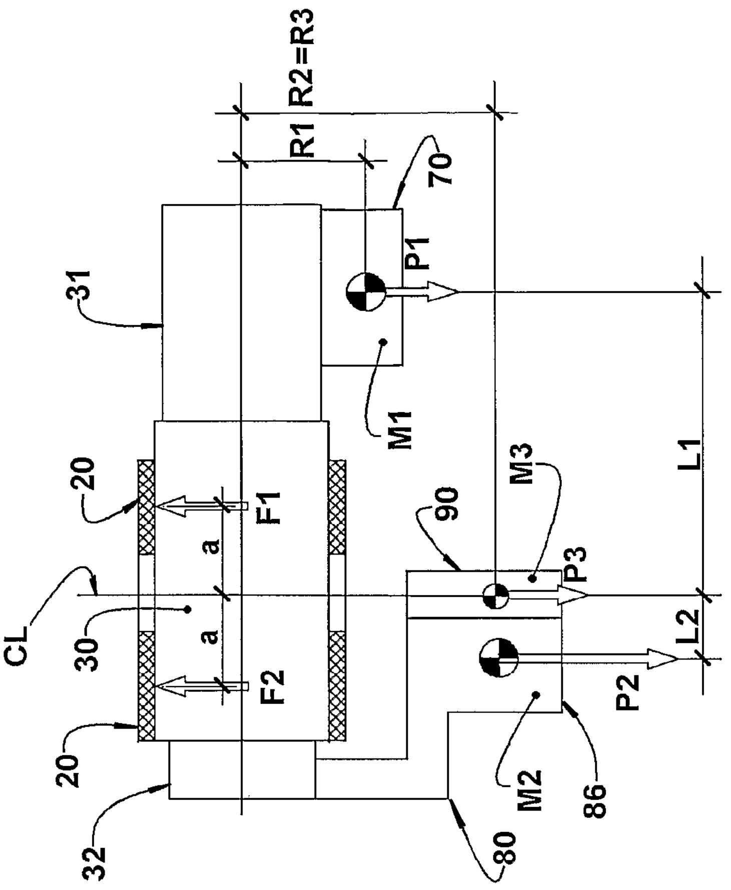
FIG. 2B is a schematic representation equal to that illustrated in FIG. 2A, but with the vibrator shaft further carrying, externally to the equipment, a third adjusting counterweight, dimensioned to produce the desired vibrating effect in the equipment and positioned aligned with the center line of the bearing housing, to maintain the balance of the loads on the bearings.
Figure 2A:
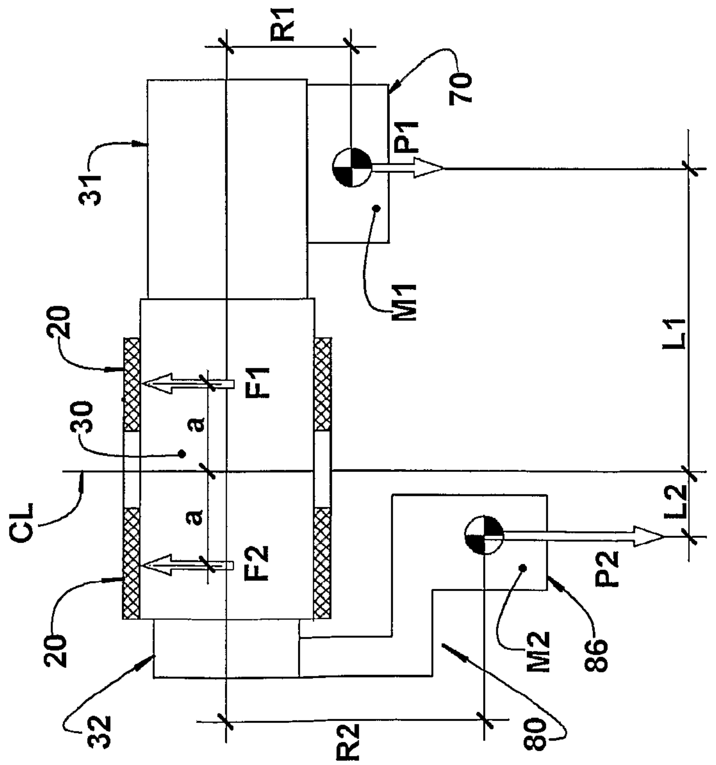
FIG. 2A is a schematic representation of the vibrator object of the present invention, in a balanced condition of the loads on the bearing housing and having its shaft carrying only one internal counterweight and one external counterweight in relation to the equipment.

As already described with respect to the prior art (see FIG. 1) the inner end portion 31 of the shaft 30 affixes, usually by means of bolts 71, a first counterweight 70 having a first eccentric mass M1 which corresponds to a fixed amount of the total eccentric mass of the vibrator V. FIGS. 2A, 2B illustrate said first counterweight 70 with its first eccentric mass M1 positioned at a first distance L1 from the center line of the bearing housing 10 and presenting a first predetermined radial extension R1. Considering the interest in providing a first counterweight 70 which occupies the least possible space in the interior of the equipment, from the determination of the fixed amount of the minimum total eccentric mass of the vibrator, to be supplied by the first eccentric mass M1 of the first counterweight 70, a first distance L1 is defined from the center line CL of the bearing housing 10 the sufficient to maintain the radial extension R1 of the first eccentric mass M1 of said first counterweight 70 the smallest possible and also adequate to produce, upon the rotation of the shaft 30, a certain first load P1.

On the other hand, the outer end portion 32 of the shaft 30 affixes a second counterweight 80 having a second eccentric mass M2 larger than the first eccentric mass M1 of the first counterweight 70, a second radial extension R2 larger than the first radial extension R1 of the first eccentric mass M1 of the first counterweight 70 and a second distance L2 from the center line CL of the bearing housing 10 smaller than the first distance L1 of the first eccentric mass M1.

The second eccentric mass M2 should represent another fixed and complementary amount of the minimum nominal eccentric mass to be produced by the vibrator V under operation. Since the same limitations of radial extension of the counterweight are not found in the exterior of the equipment 1, the second counterweight 80 can have a second eccentric mass M2 and a second radial extension R2 larger than the first eccentric mass M1 and the first radial extension R1, as long as the second distance L2 to the center line of the bearing housing 10 conducts to a respective second load P2 equal to the first P1, maintaining balanced loads on the bearings 20.

The balance condition of the reaction forces F1, F2 generated in the bearings 20, as a function of the loads P1, P2 relative to the first and to the second eccentric mass M1, M2 in the operations of the vibrator V, is schematically illustrated in FIG. 2A and can be represented as follows:

$$P1 \times L1 = P2 \times L2 \quad \Rightarrow Mo = 0$$

$$F1 = F2 = \frac{P1 + P2}{2}$$

Also according to the invention, the setting of the total eccentric mass of the vibrator V is made by means of a third counterweight 90 having a third predetermined eccentric mass M3 to be removably coupled to the second counterweight 80, preferably to an eccentric portion 86 of the second counterweight 80, to maintain the third eccentric mass M3 aligned with the center line of the bearing housing 10.

The constructive arrangement cited above permits increasing the second mass M2 of the second counterweight 80 by adding the third mass M3, without affecting the balance of the reaction forces F1, F2 generated on the bearings 20, as schematically illustrated in FIG. 2B and which can be represented as follows:

$$P1 \times L1 = P2 \times L2$$

$$P1 \times L1 - P2 \times L2 + P3 \times 0 - F1 \times a + F2 \times a = 0$$

$$F1 = F2$$

$$P1 + P2 + P3 - F1 - F2 = 0$$

$$F1 = F2 = \frac{P1 + P2 + P3}{2}$$

a=distance between the reaction forces F1 and F2 and the center line CL of the bearing housing.

Preferably, the third counterweight 90 is configured to maintain unaltered the second radial extension R2 of the eccentric mass (M2+M3) carried by the outer end portion 32 of the shaft 30, the value of the third eccentric mass M3 being selected as a function of the setting of the total eccentric mass to be moved by the vibrator.

Thus, the provision of the third counterweight 90 alters only the value of the total eccentric mass of the vibrator V, without causing any alteration over the balance of the reaction forces F1, F2 generated in the bearings 20.

In the illustrated construction, the second counterweight 80 is defined by an annular hub 81 attached around the outer end portion 32 of the shaft 30 and incorporating an axial projection 82 projecting towards the center line CL of the bearing housing 10, radially externally to the latter. In the illustrated construction, the axial projection 82 takes the form o a tubular skirt concentric to the shaft 30 and surrounding, with a certain radial gap, an extension of the bearing housing 10 externally to the center line LC.

The annular hub 81 can be attached to the shaft 30 in different ways such as, for example, by means of a key 83 and of an end locking plate 84, affixed to the shaft 30 by bolts 85, only one of which being illustrated in FIG. 4.

In the illustrated construction in FIG. 4, in the end plate 84, there is mounted a coupling means 38, for example, a cardan joint, so that the outer end portion 32 of the shaft 30 can be coupled to the outlet shaft of a motor unit (not illustrated).

The second counterweight 80, likewise the first counterweight 70, is made of any adequate material, such as steel or cast iron. Preferably, the second counterweight 80 further incorporates, in its tubular skirt 82, an eccentric portion 86 disposed axially externally to and slightly spaced from the center line CL of the bearing housing 10, said eccentric portion 86 defining the second eccentric mass M2 of the second counterweight 80.

The eccentric portion 86 presents an axial end face 86*a* turned to the center line CL of the bearing housing 10 and maintaining a predetermined distance "d" therefrom, as best illustrated in FIG. 4.

The eccentric portion 86 of the second counterweight 80 is preferably configured in the annular form, extending along an angle which varies as a function of the vibrator project, and it may present, for example, a circumferential extension of up to about 180°, the axial end face 86*a* of said eccentric portion being configured to allow to selectively and removably affix weight portions 90*a* of a third counterweight 90 thereon.

As illustrated and already mentioned, the third counterweight 90 is designed so that its third eccentric mass M3 maintains the same radial extension R2 of the eccentric portion 86 of the second counterweight 80 and being maintained aligned with the center line CL of the bearing housing 10 when the third counterweight 90 is attached to the axial end face 86*a* of the eccentric portion 86 of the second counterweight 80, so that the third eccentric mass M3 of the third counterweight 90 causes no unbalance whatsoever in the reaction forces F1 and F2 generated in the bearings 20. The fixation of the third counterweight 90 can be made by bolts 87, of which only one is illustrated in FIG. 4 of the drawings, which are disposed through axial holes 86*b*, 90*b* provided in the eccentric portion 86 and in the third counterweight 90.

Figure 5A:
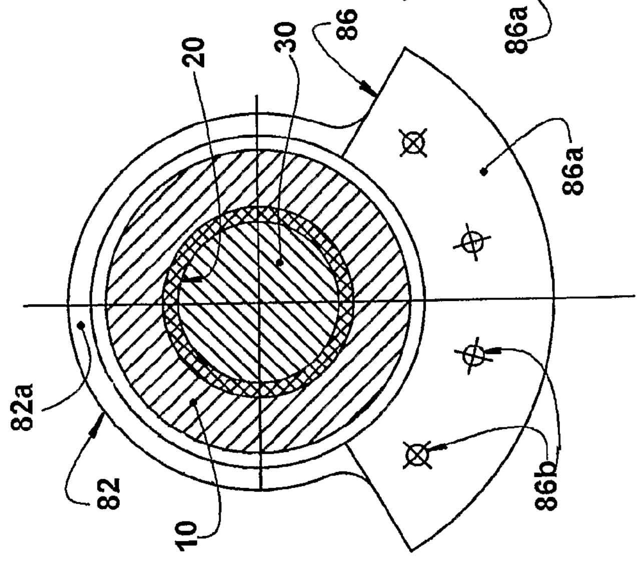
FIGS. 5A, 5B and 5C represent cross-sectional views of the vibrator carrying different assemblies of third counterweight, taken according to line V-V in FIG. 3.
Figure 5B:
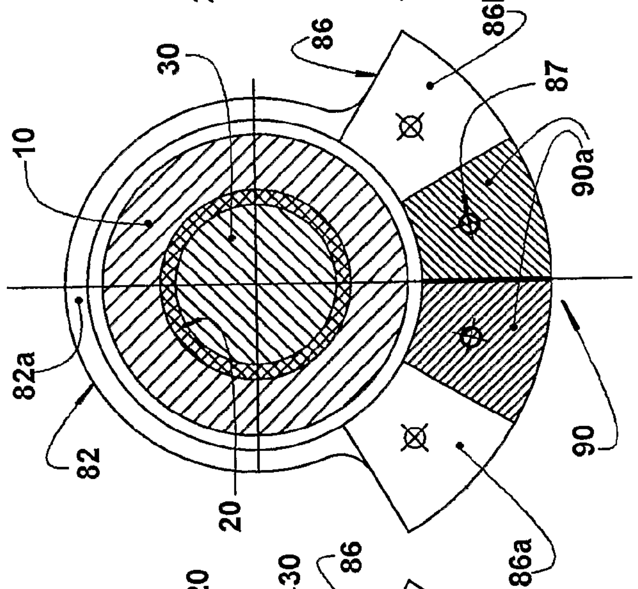
Figure 5C:
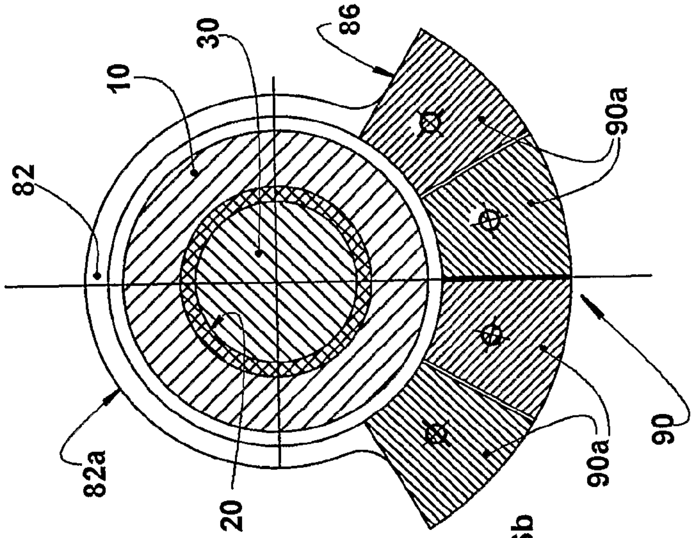

As illustrated in FIGS. 5A, 5B and 5C, the third counterweight 90 can be defined by weight portions 90*a* to be attached, by the bolts 87, in the eccentric portion 86 of the second counterweight 80, each weight portion 90*a* being provided with a respective hole 90*b* for passing the bolt 87.

FIG. 5A illustrates an assembly in which the vibrator V does not include any third counterweight 90 attached to the eccentric portion 86 of the second counterweight 80.

FIG. 5B illustrates an assembly in which a pair of weight portions 90*a* are affixed to the eccentric portion 86 of the second counterweight 80, to define a first value of the third eccentric mass M3 of the third counterweight.

FIG. 5C illustrates an assembly in which the third eccentric mass M3 is increased by fixing to the second counterweight 80, one more pair of weight portions 90*a*.

In the illustrated construction in FIGS. 5*a*, 5B and 5C, the variation of the third eccentric mass M3 is made by means of weight portions 90*a* which present an axial thickness corresponding to the double of distance "d" between the axial end face 86*a* of the eccentric portion 86 and the center line CL of the bearing housing 10 and further a third radial extension R3 equal to the second radial extension R2 of the second eccentric mass M2.

However, the setting of the total eccentric masses of the vibrator V can be made by modifying the radial extension of the weight portions 90*a* of the third counterweight 90, dividing the weight portions 90*a* in multiple layers that are mutually seated in the axial direction of the vibrator and which can be spaced from the eccentric portion 86 of the second counterweight 80, by one or more spacers of reduced mass.

Figure 3:
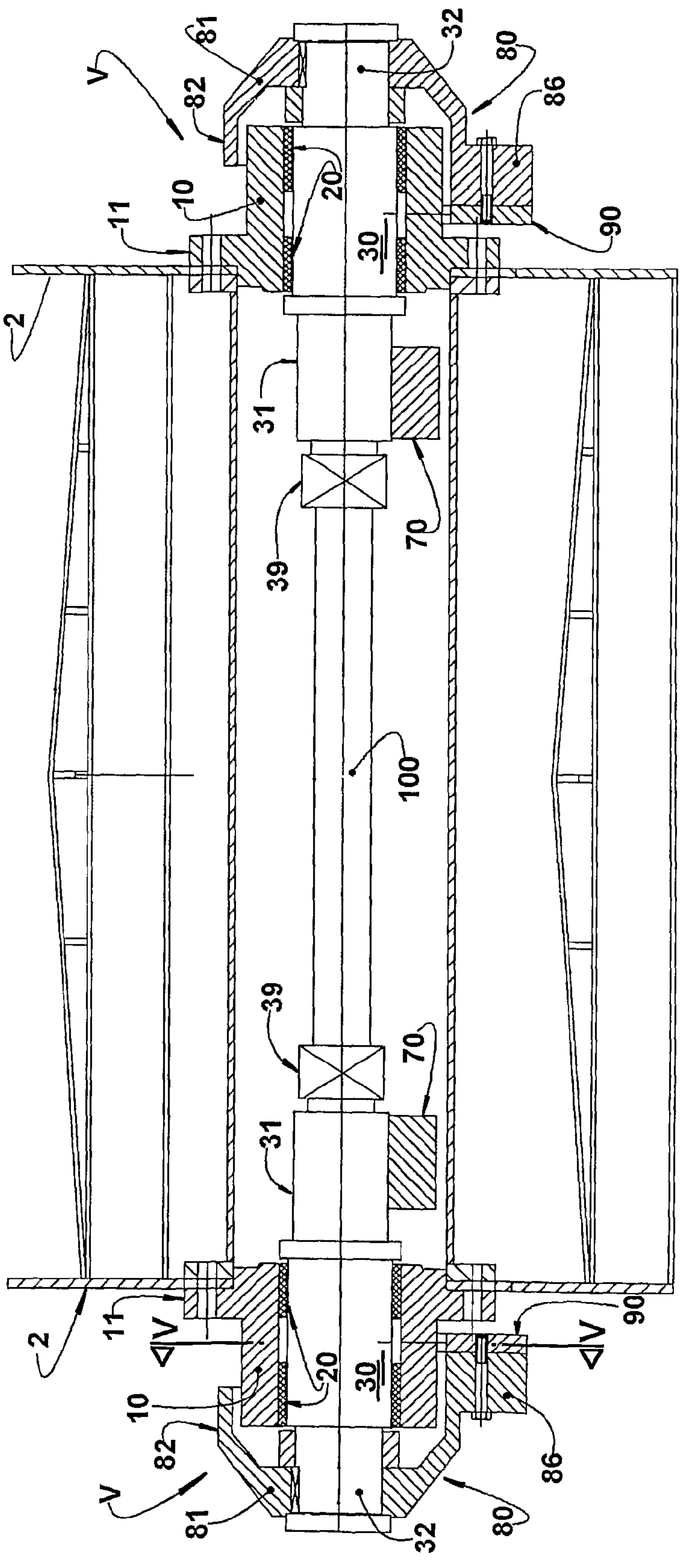
FIG. 3 represents a diametral longitudinal sectional view of a pair of vibrators of the present invention, when mounted on respective opposite side walls of the equipment and having their shafts mutually coupled by a connecting shaft.

As illustrated in FIGS. 3 and 4, the vibrator V, mounted on one of the side walls 2 of the equipment, can have the inner end portion 31 of the shaft 30 coupled, through connecting means 39, to an end of a connecting shaft 100, whose opposite end is likewise coupled to the shaft 30 of an identical vibrator V mounted on the opposite side wall 2 of said equipment 1, one of the vibrators V being coupled to a motor unit, as indicated in FIG. 5.

As a function of the reduced radial extension R1 of the first counterweight 70, it is possible to protect the inner region of the vibrators V and, if existing, the connecting shaft 100, through a single protective casing 60 in the form of a tube having the opposite ends hermetically attached to the opposite side walls 2 of the equipment.

While only one constructive form for setting the eccentric mass of the vibrator has been illustrated herein, it should be understood that modifications can be made in the form and arrangement of the different component parts, provided that they fall within the inventive concept defined in the claims that accompany the present specification.

The invention claimed is:

1. A mechanical vibrator for vibrating screens or other equipment, comprising:

a bearing housing affixed to a side wall of the equipment and carrying, internally and symmetrically to a center line:

a pair of bearings;

a shaft supported by the pair of bearings and having an inner end portion and an outer end portion projecting outwardly from the bearing housing, wherein the inner end portion and the outer end portion of the shaft respectively affix a first counterweight and a second counterweight having respective first and second eccentric masses of different values and presenting respective first and second radial extensions and first and second distances to the center line of the bearing housing, which are dimensioned so that said first and second counterweights generate equal loads on the bearings and balance of bending moments on the side wall of the equipment, said second counterweight selectively and removably attached to a third counterweight presenting a third eccentric mass that is maintained aligned with the center line of the bearing housing to provide a respective variation of the total eccentric mass of the vibrator, without changing the balance of the distribution of loads on the bearings.

2. The mechanical vibrator, as set forth in claim 1, wherein the second eccentric mass and the second radial extension related to the second counterweight are greater than the first eccentric mass and the first radial extension related to the first counterweight, the second distance of the second eccentric mass to the center line of the bearing housing being smaller than said first distance related to the first counterweight.

3. The mechanical vibrator, as set forth in claim 1, wherein each of the bearings is defined by a bushing.

4. The mechanical vibrator, as set forth in claim 1, wherein the sum of the first eccentric mass the first eccentric counterweight and the second eccentric mass of an eccentric portion of the second eccentric counterweight, defines the minimum nominal eccentric mass of the vibrator.

5. The mechanical vibrator, as set forth in claim 1, wherein the second counterweight presents an eccentric portion which defines the second eccentric mass and in which is selectively and removably attached to the third counterweight.

6. The mechanical vibrator, as set forth in claim 5, wherein the second counterweight comprises an annular hub attached around the outer end portion of the shaft and incorporating an axial projection projecting towards the center line of the bearing housing, external to the bearing housing in a radial direction, said axial projection carrying the eccentric portion of the second counterweight.

7. The mechanical vibrator, as set forth in claim 5, wherein the third counterweight presents a radial extension equal to a radial extension of the eccentric portion of the second counterweight.

8. The mechanical vibrator, as set forth in claim 6, wherein the axial projection of the second counterweight has the form of a tubular skirt concentric to the shaft and surrounding, with a certain radial gap, an extension of the bearing housing, external to the center line.

9. The mechanical vibrator, as set forth in claim 6, wherein the eccentric portion presents an axial end face turned to the center line and maintaining a distance from the center line, said third counterweight being removably coupled to said axial end face.

10. The mechanical vibrator, as set forth in claim 9, wherein the eccentric portion of the second counterweight takes an annular form, with a circumferential extension of up to about 180°.

11. The mechanical vibrator, as set forth in claim 10, wherein the third counterweight is defined by weight portions to be selectively affixed against the axial end face of the eccentric portion.

12. The mechanical vibrator, as set forth in claim 11, wherein the weight portions present the same radial extension, equal to the second radial extension of the second eccentric mass.

* * * * *